M. R. JACOBUS.
POULTRY FEEDER.
APPLICATION FILED MAR. 20, 1916.
1,359,808.
Patented Nov. 23, 1920.
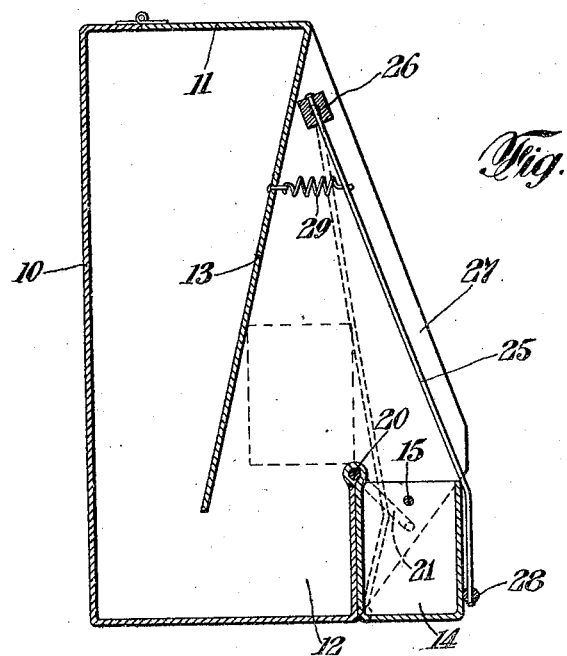
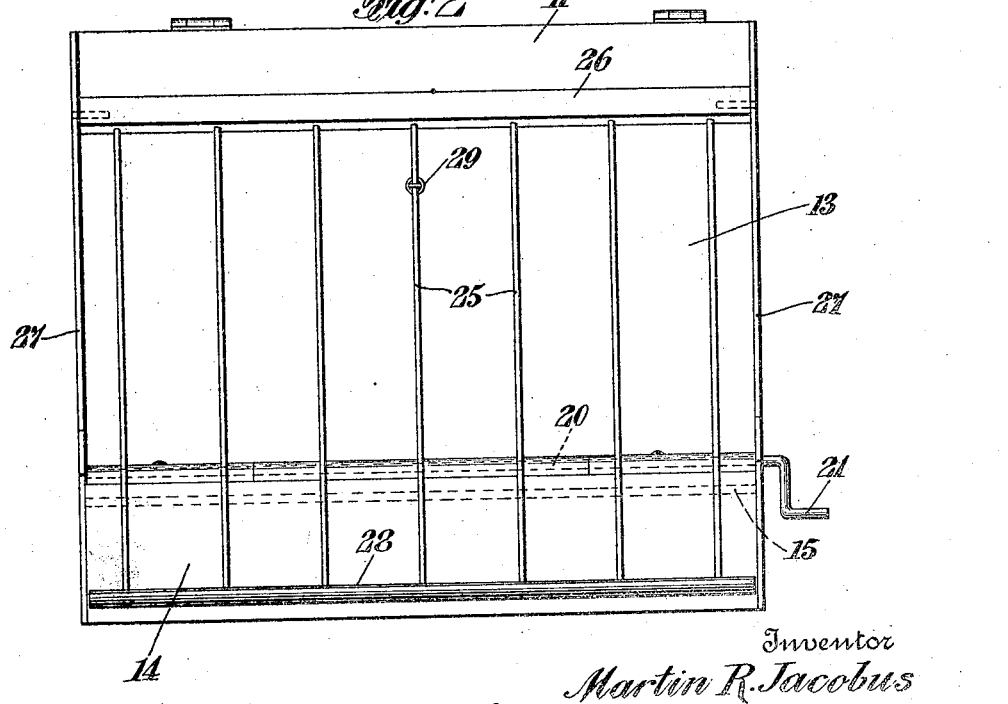
Inventor
Martin R. Jacobus
By his Attorney

UNITED STATES PATENT OFFICE.

MARTIN R. JACOBUS, OF RIDGEFIELD, NEW JERSEY.

POULTRY-FEEDER.

1,359,808.  Specification of Letters Patent.  Patented Nov. 23, 1920.

Application filed March 20, 1916. Serial No. 85,393.

*To all whom it may concern:*

Be it known that I, MARTIN R. JACOBUS, a citizen of the United States, and a resident of Ridgefield, in the county of Bergen and State of New Jersey, have invented certain new and useful Poultry-Feeders, of which the following is a specification.

The invention relates to a feeder for stock as poultry and the like, and it has for its object to construct a feeder wherein the feed scattered is caught and retained in a suitable receptacle, thereby preventing waste and the eating of soiled food. It has for a further object to afford a convenient return of the feed thus collected to the main supply or receptacle, and to secure, also, the latter against vermin during the period that the feeder is not in use.

The nature of the invention will be best understood when described in connection with the accompanying drawings, in which—

Figure 1 is a vertical section through a preferred form of feeder.

Fig. 2 is a front elevation thereof.

Similar characters of reference designate corresponding parts throughout the several views.

Referring to the drawings, 10 designates a hopper or feed reservoir provided at the top with a hinged lid or cover 11, open at the bottom, and terminating in a feed receptacle 12. The forward wall 13 of the hopper is preferably rearwardly directed to form a downwardly-tapering hopper, affording sufficient opening for the receptacle 12 as well as to provide an abutment in connection with the locking of the feeder against vermin, as will be hereinafter more fully set forth. In front of the receptacle 12 and extending along its length is a waste receptacle 14, which is designed to catch the feed thrown or dropped in eating from the receptacle 12. In order to prevent access to the contents of receptacle 14, as received from the receptacle 12, the former is provided near its top with a suitable grating, which may consist of a single rod 15, as shown, or of other suitable covering means, providing sufficient opening to receive the scattered feed and at the same time preventing access to the same for feeding.

The receptacle 14 is preferably arranged to be hingedly connected to the receptacle 12, in order that the waste food recovered may be returned, when sufficient has been collected, to the feed receptacle 12. In hingedly connecting the receptacle 14 to the receptacle 12, it is preferred to secure part of the hinged portion to the pintle 20, which latter is arranged to extend beyond one end of the feeder, and is provided with a suitable handle 21 whereby the receptacle 14 may be turned upwardly and inverted over the receptacle 12, as indicated in dotted lines in Fig. 1 of the drawings.

When hingedly attached, as shown in Fig. 1, the receptacle 14 is arranged to be secured in position by means of a plurality of rods 25, forming a vertical grating extending over the front of the feeder, and preventing, also, the fowls from entering upon the feed and waste receptacles, and diminishing the tendency to scatter feed. At its upper end, the grating is carried by the transverse rod 26, which is pivotally attached to the sides 27 of the feeder, while the lower ends of the rods 25 are connected to a transverse rod 28 which bears against the outer wall of the waste receptacle 14, and holds the same firmly in position against the receptacle 12. A tension is exerted thereon by a spring 29, one end of which is attached to the said grating, and the other to the wall 13. In inverting the receptacle 14, the grating 25 will rise to permit the receptacle to rotate and will then bear against the receptacle in the inverted position, as indicated in dotted lines. In this position, it is to be noted that receptacle 14 entirely closes the feeder, and secures the contents of the same against vermin, being held in locked position by the action of spring 29.

I claim:

1. A poultry feeder, comprising: a feed receptacle; a waste receptacle pivotally attached to the feed receptacle to receive and collect waste feed and adapted to be inverted over the said receptacle to return the same to the latter; and a suitable grating over the waste receptacle to prevent access to its contents.

2. A poultry feeder, comprising: two adjacent receptacles, the forward or waste receptacle, over which access is had to the other or feed receptacle, being adapted to receive the scattered feed taken therefrom, and being pivotally attached, also, thereto to be rotated into position to directly return the scattered feed to the said feed receptacle upon rotation of said waste receptacle, and simultaneously therewith to lock the feeder against vermin, and a barrier at each side of the feed receptacle to prevent access thereto except over the waste receptacle.

3. A poultry feeder, comprising: a feed receptacle, a waste receptacle pivotally attached to the feed receptacle and adapted to be rotated into position to return the waste feed to the latter, and simultaneously therewith to lock the feeder against vermin; and a suitable grating over the waste receptacle to prevent access to its contents.

4. A poultry feeder, comprising: a feed reservoir open at the bottom and terminating in a feed receptacle; a waste receptacle pivotally attached to the said receptacle and adapted to be rotated into position to return the waste feed to the latter, and simultaneously therewith to lock the feeder against vermin; a suitable grating covering the waste receptacle to prevent access to its contents; and resilient means to lock the waste receptacle in its position before the feed receptacle and in its revolved position.

5. A poultry feeder, comprising: a feed reservoir open at the bottom and terminating in a feed receptacle; a waste receptacle pivotally attached to the said receptacle and adapted to be rotated into position to return the waste feed to the latter; a vertically-inclined grating pivotally attached to the feed reservoir and bearing upon said waste receptacle; and a spring attached to the grating and to said reservoir.

Signed at New York, in the county of New York and State of New York, this 17th day of March, A. D. 1916.

MARTIN R. JACOBUS.